United States Patent [19]

Perrault et al.

[11] 4,379,537
[45] Apr. 12, 1983

[54] CABLE HANGER

[75] Inventors: Frederick Perrault, Torrance; Raymond E. Perrault, Rancho Palos Verdes, both of Calif.

[73] Assignee: Whipple Patent Management Corporation, Sherman Oaks, Calif.

[21] Appl. No.: 291,350

[22] Filed: Aug. 10, 1981

[51] Int. Cl.³ .............................................. F16L 3/08
[52] U.S. Cl. .................................. 248/74 R; 411/136; 411/437
[58] Field of Search ................. 248/74 R, 74 B, 68 R, 248/62, 239, 70, 59, 298, 300; 411/437, 324, 301, 306, 136

[56] References Cited

U.S. PATENT DOCUMENTS

| 1,042,881 | 10/1912 | Bowen | 248/74 R |
|---|---|---|---|
| 2,939,664 | 6/1960 | Wesseler | 248/68 R |
| 2,964,274 | 12/1960 | Richardson et al. | 248/68 R |
| 3,143,325 | 8/1964 | Carpenter | 248/68 R |
| 3,315,924 | 4/1967 | Greenwood | 248/300 X |
| 3,334,851 | 8/1967 | Cassidy et al. | 248/68 R |
| 3,632,069 | 1/1972 | Thayer | 248/74 PB |
| 3,633,857 | 1/1972 | Logan | 248/62 |
| 3,777,356 | 12/1973 | Hemingway | 411/306 X |
| 3,966,154 | 6/1976 | Perrault et al. | 248/74 R X |

FOREIGN PATENT DOCUMENTS

| 238869 | 4/1959 | Austria | 411/437 |
|---|---|---|---|
| 555401 | 8/1943 | United Kingdom | 411/437 |
| 1192700 | 5/1970 | United Kingdom | 248/70 |

Primary Examiner—William H. Schultz
Assistant Examiner—Ramón O. Ramírez
Attorney, Agent, or Firm—Gausewitz, Carr, Rothenberg & Edwards

[57] ABSTRACT

This invention provides a bracket adapted to hold cables or the like, the bracket being a unitary member that includes a longitudinally split internally threaded sleeve from one end of which is a connecting element that extends to the side edge of a flat plate having end flanges defining slots to receive a banding strap, and side flanges extending between the end flanges for providing strength and rigidity.

10 Claims, 4 Drawing Figures

CABLE HANGER

BACKGROUND OF THE INVENTION

The electrical systems of ships are made up of cables which may extend for long distances through the ship, consequently requiring many cable hangers to maintain them in their proper locations. Cable hangers for use in ships must meet high performance standards because of the constant vibrational forces to which they are subjected, as well as the necessity to withstand shock loads. Consequently, cable hangers for ships often have been relatively complicated and expensive, and may be bulky and heavy. Nevertheless, they may be subject to breakage inasmuch as welded connections may be necessary in the bracket structure. Also, the conventional wire hanger for marine use is relatively difficult to install and it is not a simple task to secure the cable to the hanger. In some designs, the cable hanger is secured to the bulkhead or deck by a threaded connection which is subject to loosening under vibration and which may not permit the positioning of the bracket at the proper rotational location while tight on the threaded support.

BRIEF DESCRIPTION

The present invention overcomes the difficulties of the prior art with a small, lightweight, compact and yet strong bracket that is easily used to support the cables. The bracket is made from one piece of sheet metal by stamping so that it has no welds to break or connections to make, and its construction is considerably cheaper than other designs. Nevertheless, it possesses adequate strength to withstand all the forces imposed upon it. The cable hanger of this invention is easily and rapidly used in making the attachment of the cable, not requiring a great degree of skill in making the installation. The cable is held securely without likelihood of damage to it.

The bracket forming the cable hanger includes an internally threaded split sleeve which is adapted to engage a threaded stud projecting from a bulkhead, deck or the like. The split allows the thread of the sleeve to resiliently grip the thread of the stud to provide a locking effect which prevents loosening under vibration and permits the bracket to be tight on the stud at any selected rotational position.

From one end of the threaded sleeve projects a portion that connects to one side of a flat plate which is positioned perpendicular to the axis of the sleeve. The connecting portion is curved adjacent the sleeve for added strength and rigidity, flaring laterally to a wider dimension providing strength at the point of its connection to the flat plate. Opposite side flanges on the flat plate project in the direction of the threaded sleeve to give strength and rigidity to the plate. Slotted end flanges also project from the plate toward the sleeve and provide guides for receiving a banding strap that is used to clamp cables to the opposite surface of the plate. The strap is readily fed through the guide slots and easily wrapped around the cables that are secured against the outer surface of the flat plate and securely held in position.

DETAILED DESCRIPTION OF THE PREFERRED EMBODIMENT

The bracket 10 of this invention preferably is of one-piece construction made by a stamping process as disclosed in U.S. Pat. No. 4,266,310, which is incorporated herein by reference. The bracket includes an internally threaded sleeve 11 having a longitudinal split 12 which runs the length of the sleeve and enables the threads to provide a locking effect. The beginning portion of the thread, extending inwardly from the outer end 13 of the sleeve may be relatively loose with respect to the stud which is to enter the sleeve. This allows the meshing of the threads to commence without difficulty. However, the inner portion of the thread may be made tight with respect to the stud. This means that the sleeve will spring apart slightly at the split 12 when the stud enters, resulting in a resilient locking force on the stud.

Figure 3:
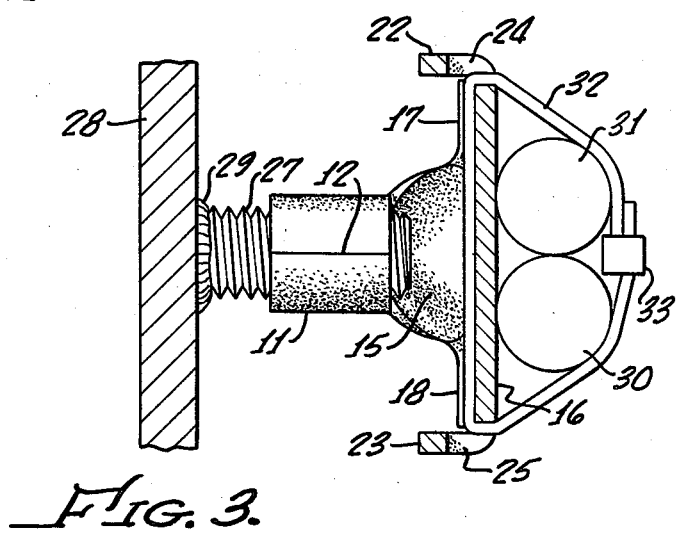
FIG. 3 is a sectional view, taken along 3—3 of FIG. 2.

Projecting axially from the opposite end 14 of the sleeve 11 is a connecting element 15, the inner end of which is joined to the sleeve through approximately the lower half of the circumference of the sleeve at the end 14. The opposite end of the connecting element 15 extends to one of the longer edges of a flat rectangular plate 16 which is transverse to the sleeve 11, being perpendicular to the axis of the sleeve. This gives the bracket a substantially T-shape in plan, as seen in FIG. 3. The connecting section 15 flares outwardly from the sleeve 11 so that it is of increased width where it makes its connection to the plate 16. Its outer edges fair into side flanges 17 and 18 which project vertically from the plate 16 toward the sleeve 11.

The connecting section 15 forms a continuation of the sleeve 11 and has some of the curvature of the sleeve 11 adjacent the end 14 of the sleeve, but becomes flatter at its wider part where it joins to the plate 16. The curvature causes the section 15 to act as a channel at its narrower part, thereby increasing its strength. Where the connecting section is relatively flat, adjacent the plate 16, it is wider which improves the load carrying capacity at that part of the section 15. The plate 16 projects upwardly from the edge to which the section 15 connects, so that it is opposite from the upper half of the sleeve end 14. This positioning of the plate 16 helps make the bracket 10 of minimum overall dimension with good load carrying capacity.

A side flange 20 projects perpendicularly from the plate 16 toward the sleeve 11 along the edge of the plate opposite from the flanges 17 and 18. These side flanges add to the strength and rigidity of the plate 16.

Also projecting perpendicularly from the plate 16 toward the sleeve 11 are U-shaped end flanges 22 and 23 that define elongated slots 24 and 25, respectively. These flanges are of greater height than are the side flanges 17, 18 and 20. The side flanges extend between the end flanges 22 and 23, but are not connected to them.

Figure 1:
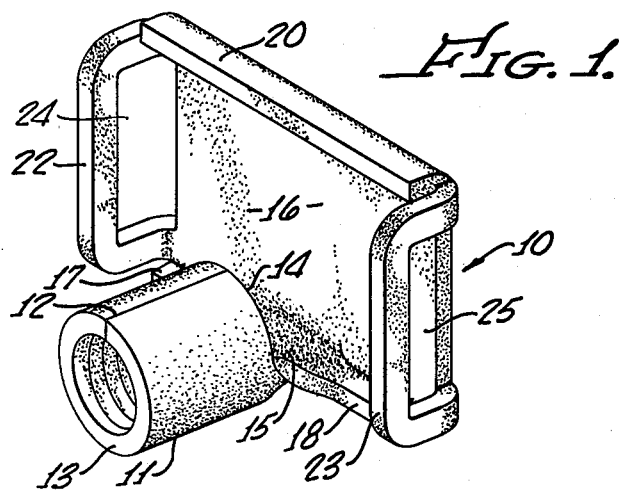
FIG. 1 is a perspective view of the cable hanger of this invention.
Figure 2:
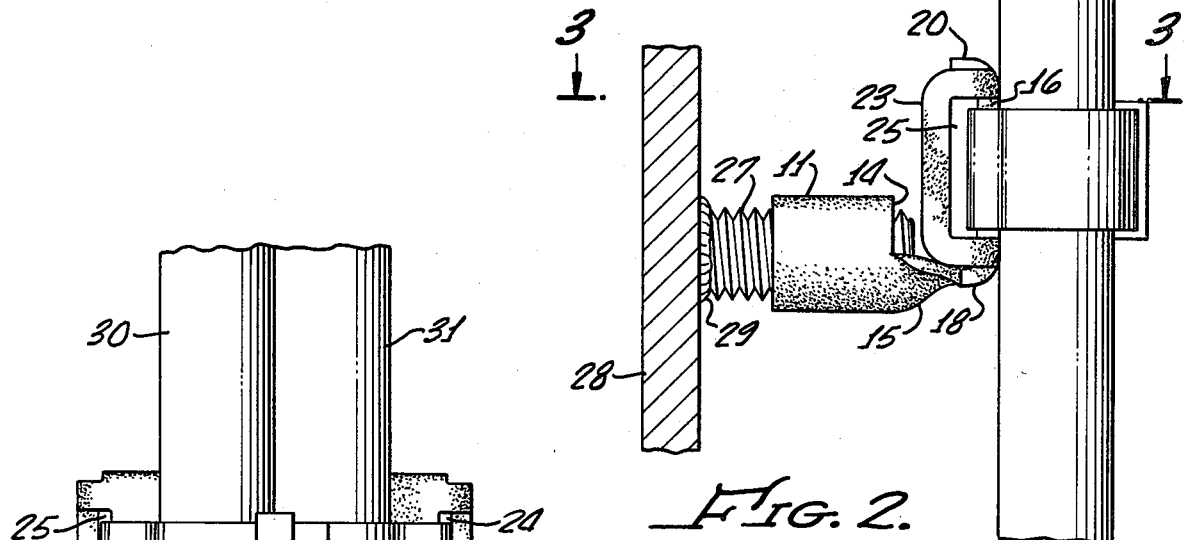
FIG. 2 is a side elevational view of the cable hanger as used in supporting cables.
Figure 4:
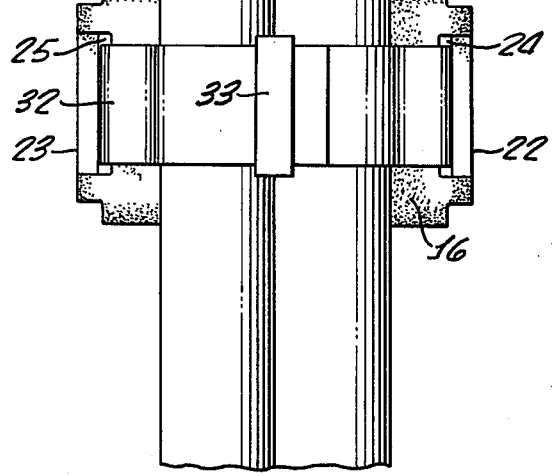
FIG. 4 is an end elevational view of the arrangement of FIG. 2.

As shown in use in FIGS. 2, 3 and 4, the sleeve 11 is threaded onto a threaded stud 27 which is secured to a bulkhead 28 by a weld 29. Because of the thread locking effect described above, the bracket 10 may be positioned in any rotational position relative to the stud 27 while the sleeve 11 is tight on the stud. In this instance the bracket is projecting horizontally from the bulkhead 28 for holding vertical electrical cables 30 and 31. Therefore, the bracket is positioned so that the cables 30 and 31 can extend across the plate 16 transversely. This means that the major dimension of the plate 16 is in the horizontal direction and the U-shaped end flanges 22 and 23 are on opposite sides of and parallel to the cables 30 and 31.

The cables 30 and 31 are secured to the bracket 10 by extending a banding strap 32 through the end slots 24 and 25 so that it extends lengthwise of the plate 16 on the underside of the plate, that is, the side adjacent the sleeve 11. From the slots 24 and 25, the strap 32 extends over the cables 30 and 31, and when tightened is secured by a suitable locking means 33 of conventional design. Thus, the connection of the cables to the bracket is effected very rapidly and easily. The U-shaped end brackets 22 and 23 effectively retain the strap 32 so that it is held to the plate 16 and always will retain the cables 30 and 31 to the plate. At the same time, the slots 24 and 25 defined by the end flanges 22 and 23 are of sufficient height to allow easy threading of the banding strap 32 through the slots. The bracket 10 presents an entirely flat surface at the plate 16 where the cables 31 and 32 are located, assuring that there are no components of the bracket to interfere with cable positioning or to cause damage to the cable. The flat plate 16 provides an effective, stable base for the cables 30 and 31 so that they remain in their clamped position and will not move around, irrespective of vibrational or other loads. Also, the bracket is compact with all of the projections from the support plate 16 extending rearwardly back toward the bulkhead so that it does not interfere with any other equipment in the vicinity.

The bracket 10 may be used to support tubing, pipes or other components, as well as cables.

The foregoing detailed description is to be clearly understood as given by way of illustration and example only, the spirit and scope of this invention being limited solely by the appended claims.

What is claimed is:

1. A bracket for supporting a cable or the like comprising
a unitary one-piece member having
an internally threaded sleeve,
a substantially flat plate spaced from one end of said sleeve and substantially perpendicular to the axis thereof, with a portion of said substantially flat plate being opposite a portion of said one end of said sleeve,
an interconnecting element forming a continuation of and extending axially from said one end of said sleeve to one side edge of said substantially flat plate for connecting said sleeve to said plate,
and opposite end flanges projecting from said plate toward said sleeve, said end flanges defining slots therethrough adapted to receive a strap extended around said plate to hold cables to the surface of said plate opposite from said sleeve.

2. A device as recited in claim 1 in which said interconnecting element is curved to define a channel-like portion adjacent said one end of said sleeve, and is relatively flatter adjacent said plate, said interconnecting element flaring laterally toward said plate so that it is wider adjacent said plate than it is adjacent said sleeve.

3. A device as recited in claim 2 in which said element extends from substantially one-half of the circumference of said one end of said sleeve.

4. A device as recited in claim 3 in which said plate extends from said interconnecting element so as to be opposed to the other half of the circumference of said one end of said sleeve.

5. A device as recited in claim 4 in which said plate is substantially rectangular, and said one side edge of said plate is one of the two longer edges thereof.

6. A device as recited in claim 5 including side flanges projecting toward said sleeve from the side edges of said plate and extending between said end flanges.

7. A device as recited in claim 6 in which said end flanges have greater height than said side flanges.

8. A device as recited in claim 6 in which said interconnecting element fairs into one of said side flanges on either side thereof.

9. A device as recited in claim 1 in which said internally threaded sleeve is split longitudinally whereby said sleeve can provide a thread locking effect by resiliently gripping the thread of a threaded member received therein.

10. A bracket for supporting a cable or the like comprising
a unitary one-piece member having
a longitudinally split internally threaded sleeve,
a substantially flat plate spaced from one end of said sleeve and substantially perpendicular to the axis thereof,
an interconnecting element forming a continuation of and extending from substantially one half of the circumference of said one end of said sleeve to one side edge of said substantially flat plate for connecting said sleeve to said plate,
said interconnecting element being curved to define a channel-like portion adjacent said one end of said sleeve and being relatively flatter adjacent said plate, and flaring laterally toward said plate so that it is wider adjacent said plate than it is adjacent said sleeve,
said plate being opposed to the other half of the circumference of said one end of said sleeve,
and opposite end flanges projecting from said substantially flat plate toward said sleeve, said end flanges having slots therethrough adapted to receive a strap extended around said plate to hold cables to the surface of said plate opposite from said sleeve.

* * * * *